Figure 4:
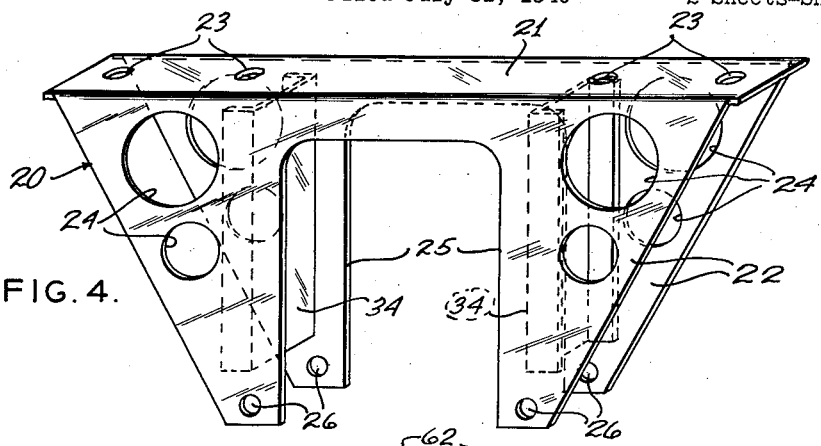

May 5, 1942.   O. H. BRAUER   2,282,161
JOURNAL ASSEMBLY FOR AXLE OR SHAFT BEARINGS
Filed July 31, 1940   2 Sheets-Sheet 1
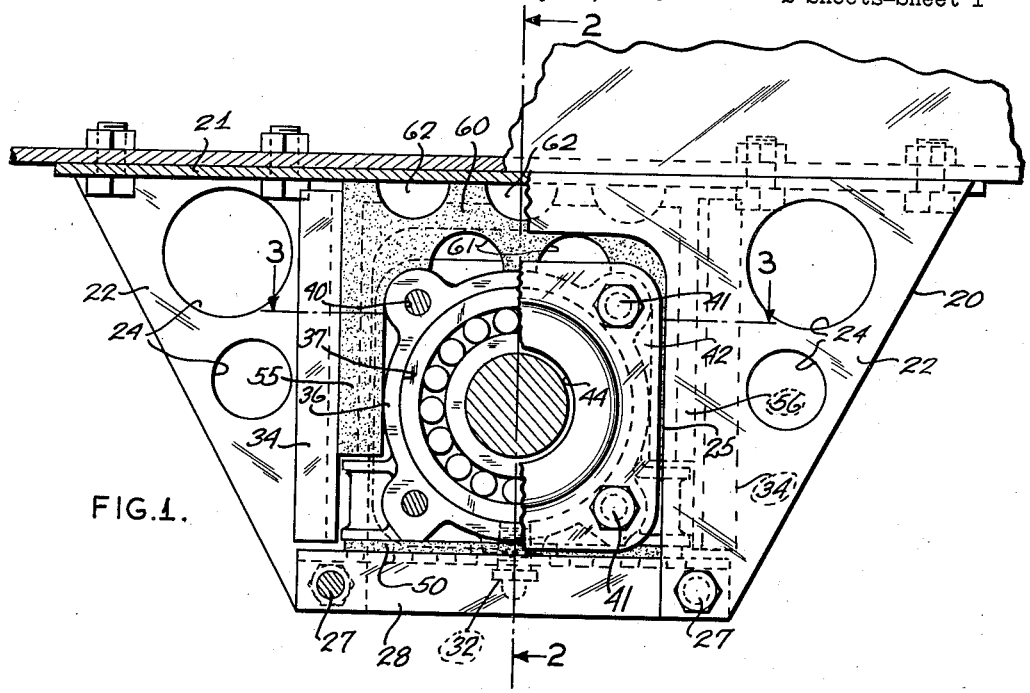
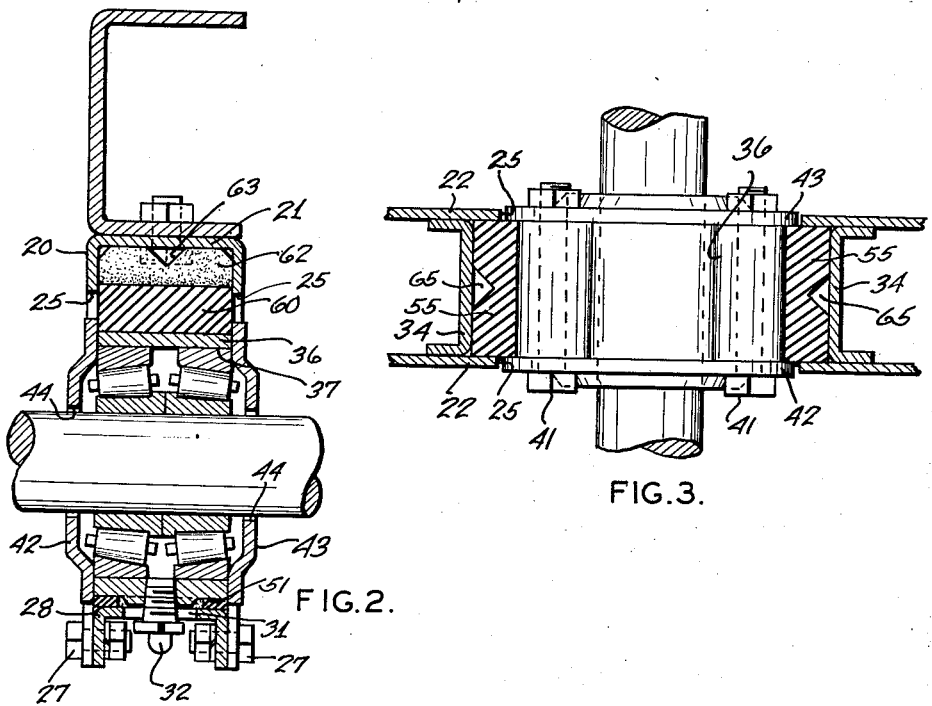
INVENTOR.
OTTO H. BRAUER
BY
Paul L. Kesler
ATTORNEY.

May 5, 1942.　　　　O. H. BRAUER　　　　2,282,161

JOURNAL ASSEMBLY FOR AXLE OR SHAFT BEARINGS

Filed July 31, 1940　　　　2 Sheets-Sheet 2

INVENTOR.
OTTO H. BRAUER
BY
ATTORNEY.

Patented May 5, 1942

2,282,161

UNITED STATES PATENT OFFICE 2,282,161

JOURNAL ASSEMBLY FOR AXLE OR SHAFT BEARINGS

Otto H. Brauer, Three Rivers, Mich., assignor to Fairbanks, Morse & Co., Chicago, Ill., a corporation of Illinois Application July 31, 1940, Serial No. 348,722

8 Claims. (Cl. 308—180)

This invention relates to improvements in journal assemblies for axle or shaft bearings, and more particularly to an improved resilient journal construction and combination with a bearing box or the like for use on vehicles, the present design having been evolved particularly for use on motor-driven railway inspection cars and similar light rolling equipment.

The lighter railway rolling stock such as railway motor cars, inspection cars and the like, have heretofore been characterized principally by relatively simple and rigid types of axle box and journal assemblies, through which the axle is mounted beneath the frame of the car. Such assemblies have, for the most part, contained no noteworthy provision for cushioning the body of the car with respect to the axle, and in the event of slight axle misalignment, the resulting damage entails considerable service expense. Such older types of journal assemblies are, moreover, noisy and subject the bearing surfaces of the journal and shaft to severe wear incident to braking stresses and the like.

The foregoing and numerous other prevalent difficulties are largely overcome by use of the arrangements to be described, and the elimination of the difficulties aforesaid accordingly constitute a major object of the invention.

Stated with some further particularity, an object of the invention is attained in a journal assembly for an axle bearing, which provides for a cushioning connection between the shaft and the car in a vertical direction as well as longitudinally of the car, and angularly of the normal, intended position of the axle or shaft; otherwise stated, this object is attained in a full-floating journal assembly particularly adapted for equipment of the type noted.

Yet another object of the invention is attained in a greater ease of removal and replacement of the axle or shaft than is possible with other journalling provisions adapted for use in comparable fields of service.

A still further object is attained in an assembly for the purposes and having the advantages noted, and which may be produced in great part from fabricated sheet steel, involving only a single casting, and requiring no more than two resilient elements for each journal assembly.

A still further object is attained in a novel, structurally simple provision for increasing the resilience and cushioning effect of a floating journal assembly, responsive to a relatively heavier loading of the vehicle.

Somewhat related to the foregoing objects, there may be additionally noted and improved design of resilient cushion element for use in a journal and bearing box assembly which, besides providing a full-floating journal assembly, exhibits an improved silencing effect due to damped vibrations otherwise transmitted between the rolling elements of the chassis, and the frame and body structure thereon.

A still further object is attained in a novel arrangement, in a resiliently floated journal assembly, of means for yieldably resisting the shocks to the car frame, normally occurring incident to quick starts and stops of the vehicle, and at the same time providing a positive limit to the extent of resilience afforded by the mounting in a direction fore and aft of the vehicle.

The general objective of the novel features embodied in the present disclosure, may be stated as the attainment of a marked simplicity of design, together with low cost and low servicing expense, particularly when used in connection with light railway rolling stock.

Figure 5:
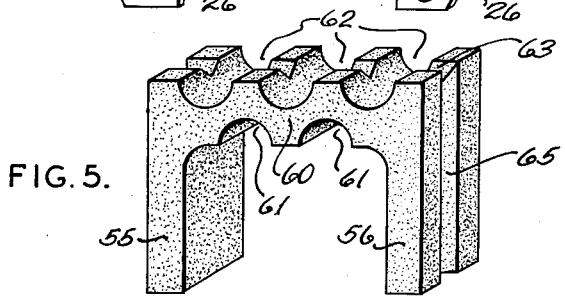
Figure 7:
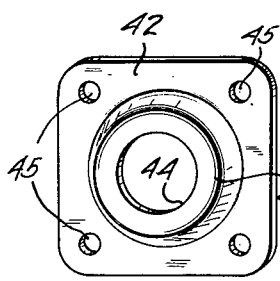
Figure 6:
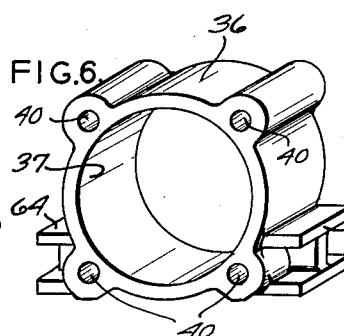
Figure 8:
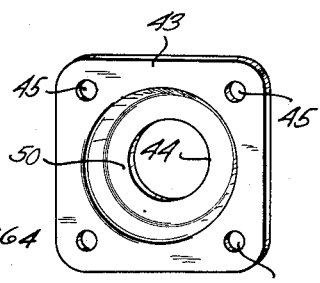
Figure 9:
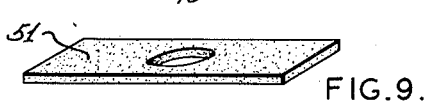
Figure 10:
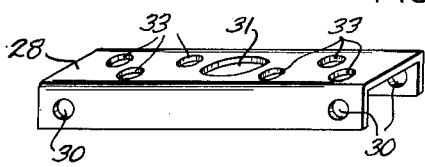

The foregoing and numerous other objects will more clearly appear from the following detailed description of a presently preferred embodiment of the invention, considered in connection with the accompanying drawings, in which:

Fig. 1 is a side elevation of a journal box and bearing assembly embodying the principles of the present invention, certain parts being broken away for clearness of illustration; Fig. 2 is a vertical sectional elevation taken along line 2—2 of Fig. 1; Fig. 3 is a section in a horizontal plane through a portion of the housing structure and certain of the cushioning elements, and showing the journal in top elevation, the sectional portions being shown as viewed along line 3—3 of Fig. 1; Fig. 4 is an elevation in perspective of the journal housing; Fig. 5 is an elevation in perspective of an upper resilient or cushioning element; Fig. 6 is an elevation in perspective of a preferred form of journal; Figs. 7 and 8 are outer and inner elevational views, respectively, of the two journal closure plates; Fig. 9 is an elevation in perspective of a rebound cushion or pad of resilient material, and Fig. 10 is an elevation in perspective of a bottom closure element for retention of the journal and cushioning members in the housing, Figs. 4 through 10 being arranged substantially to indicate an exploded view of the several parts of the assembly, exclusive of the axle and bearings proper.

Referring now by characters of reference to the drawings, the body or housing for the assembly, and providing a means for attachment thereof to the sills or frame of the vehicle, is indicated generally at 20. The bearing housing is of a generally truss form as shown, being somewhat longer along its upper margin than along its lowermost extremity. The bearing housing or body 20 may be formed of sheet steel say of 10 or 12 U. S .S. G., the initially cut sheet stock being formed to provide a central and uppermost bridging portion 21, laterally depending from which are the two side elements or flanges 22. Medially of, and in longitudinal alignment with the bridge portion 21, are provided a series of openings 23 for the reception of bolts for the securement of the bearing housing to the car sill or the like. If desired for lightness, without appreciable sacrifice of strength, a number of openings 24 may be provided in the side flanges 22 of the body or housing 20.

For the purpose of providing a receptacle or pocket for the reception of the journal proper and immediately associated parts, the side flanges 22 of the journal holder or housing 20 are each cut away to form an open-bottom, substantially rectangular journal aperture 25, and near their lowermost margins the flange members 22 are apertured as at 26 for the reception of holding bolts 27, the latter serving to keep in assembly a bottom closure plate 28. There are preferably provided four of the bolts 27, each of course carrying a nut and preferably a lock washer or the like. The bottom closure member 28 of the axle box or housing, preferably consists of a short length of an inverted channel member provided near each of its four corners with an opening 30 for the reception of the assembly bolts 27 above described. As a further preference the channel member 28 is further provided with a relatively large central opening 31, through which, in service, projects a grease fitting or the like 32. Similarly, a series of staggered openings 33 are provided in the base or connecting portion of the member 28, it later appearing that one of the journal cushioning elements is directly carried by the member 28 and the provision of the openings 33, as elsewhere in the assembly, permits the rubber or rubber-like material of such cushioning element to flow to a certain extent and thus enhance its resilient properties.

The assembly of the bearing housing or journal holder 20 further includes a pair of spaced, vertical web members or partitions which assist in defining the journal pocket, and in offering lateral restraint to one of the resilient or cushioning elements hereinafter described. These vertical web members are indicated at 34, and for ease in fabrication, each thereof is of channel form and of an outside width just sufficient to bridge the flanges 22 of the member 20, the flanges of the vertical web members 34 being welded to the interior surface of the side elements 22 of the bearing housing structure.

Referring now to a presently preferred form of journal and immediately appurtenant parts, the assembly as shown is adapted for a double roller bearing assembly of a type adapted to resist thrusts imposed in either direction on the axle, the inner races of the bearings being fitted to the shaft, and the outer races of which are carried within what is for convenience referred to as the journal proper, 36. The bearing assembly per se, may be of standard type, and forming no part of the present invention, requires no detailed description. The journal, for rigidity and durability, may consist of a malleable casting, or be otherwise suitably formed, and is preferably of a roughly rectangular outline, provided with a central race-receiving opening 37 and cornered screw or bolt apertures 40 for the reception of cap screws or bolts 41, the latter serving to retain in assembly, a front journal cover 42 and a rear journal cover 43, the covers being provided with central openings 44 to pass the shaft or axle, and with corner openings 45 for the reception of the bolts 41. An annular, outwardly projecting portion 50 is preferably provided on each of the plates 42 and 43 for better accommodation and endwise positioning of the roller bearing assembly or the like, within the journal.

Above briefly referred to is a rebound or recoil pad or cushion, which consists of a relatively thin strip of a suitable rubber or rubber-like stock or compound indicated generally at 51, and which is preferably only partly co-extensive in length, with the lower closure plate 28 for the journal housing. The rebound cushion, similarly to other cushioning members later described, is formed of a rubber or rubber-like material or compound capable of resisting high compression, and may consist of any of a number of known compounded rubber stocks such as those used for example, in motor and engine supports, or if desired, may be formed of any of the so-called synthetic rubbers or compounded stocks thereof.

The purpose of this strip of resilient material is indicated by reference to it as a rebound cushion, since it serves primarily in resisting recoil action rather than cushioning the load of the car on the axle.

Embracing the journal substantially over its remaining periphery, is a specially formed cushion element which is of generally inverted U-form and comprises a horizontal bridge piece 60, with which is integrally formed a pair of vertical leg members 55 and 56, sometimes hereinafter referred to as columns. The U-shaped cushioning member may be of a molded stock, and it is preferred at the time of molding to form in the bridge 60, a plurality of recesses, say of partly circular form as shown on one side at 61, and similarly on the opposite surface of the bridge 60, to form a series of such recesses 62, it being noted that the relieved portions 61 are staggered laterally with respect to those designated at 62, with the result that a line through the connecting neck portions between the recessed parts, is of somewhat sinuous form. The purpose of the various relieved portions such as 61 and 62, and others to be described, is to permit the resilient stock of the cushion element, to flow or to strain itself in local zones subjected to high loading, whereby to enhance its resilience. A similar purpose is served by the provision, preferably but not necessarily, of an angulate indent or channel 63 extending longitudinally of the top surface of the bridge piece 60. Although it is ordinarily sufficient to utilize only one of the U-shaped cushion structures, per channel and bearing box assembly, in cases where the width of the box is considerable, a pair or any desired plurality of the resilient members may be employed side by side.

To constitute seats and abutments for the lower end faces of the columns 55 and 56, the journal 36 is provided with a pair of lateral projecting ears or seat-forming projections 64. It is a preference that in assembly and in design of the resilient cushion structure 55, 56, 60, the bridge piece 60 be of sufficient depth so that under conditions of light loading, say of a vehicle, the columns 55 and 56 are free of compressive engagement with the seats 64, preferably fully clear thereof, as appears in Fig. 1. The purpose of this arrangement will now be obvious in that, when the vehicle is operating under no-load or light-load conditions the bridge piece 60 serves alone to cushion the loading between the journal 36 and the car frame; however, as the vehicle is more heavily loaded and the bridge piece 60 becomes more highly compressed, the columns 55 and 56 come into play and engage the seats 64 on the journal and so then augment the cushioning effect of the bridge 60. The deflection or spread of the bridge piece 60 is greatly enhanced by the provision of the groove 63 along the upper surface portion of the bridge and it is also desirable, for reasons later appearing, to provide similar grooves 65 in the outside surfaces of, and extending along each of the vertical legs or columns 55 and 56.

The assembly and function of the several parts heretofore described are thought to have been fully apparent from the foregoing delineation of structure, but it may be noted that, with the bearing housing fully fabricated, and with its lower closure element removed, and the journal and roller races assembled to the shaft, the closure plates 42 and 43 are secured over the two side faces of the journal 36 with the shaft or axle extending through the openings 44 of the cover plates. The inverted U-shaped cushion element is saddled over the journal for which it forms an embrasure and together with the recoil pad or cushion substantially completely encloses the journal in the rubber or like resilient material, it being noted that the columns 55 and 56 are assembled to lie just above the seats 64 therefor, on the journal 36. The assembly thus far is now moved inwardly of the side openings 25 of the flanges 22 of bearing housing 20, following which the bottom closure plate 28 is brought upwardly into position with the grease fitting 32 extending through the opening in the rebound pad and the registering opening in plate 28. Insertion of, and threading up of nuts on bolts 27 complete this assembly, the reverse order of which of course enables a ready dismantling of the assembly for removal of the axles for servicing thereof or of parts of the bearing assembly.

It will be noted that the U-shaped cushion elements are partly laterally confined by the flanges 22 and partly by the journal closure plates 42 and 43. In a direction endwise of the vehicle, the U-shaped cushions are confined by the web members 34 in a fore and aft direction, from which it now becomes apparent that any minor misalignment of the axle, rather than damage the bearing, will merely serve to cant the journal slightly against the resilience of the cushion members in the bearing housing 20. It will further appear that in normal loading of the vehicle, if light, the bridge piece 60 will function directly above the journal as a cushion element therefor, while under conditions of heavier loading, the columns 55 and 56 under endwise compression will augment the resilient effect of the bridge as heretofore described. It now also becomes apparent that the assembly serves advantageously upon sudden acceleration or deceleration of the vehicle to cushion the usual shocks, the column members under such conditions being subjected to lateral compression. Such lateral compression is however limited by a unique arrangement in that the journal cover plates 42 and 43 are made slightly smaller all around, than the openings 25 in flanges 22, from which it results that the sides of openings 25 serve not only to guide the plates 42 and 43 in their vertical movement relative to the journal housing, but coact with the plates and hence the journal in limiting the extent of possible lateral compression of columns 55 and 56 as occurs, say on sudden application of braking pressure to the wheels. It now appears that a fully floating journal mounting is provided, which effectively cares for a cushioning effect in all directions; namely, vertically, longitudinally of the shaft and angularly of the shaft.

Although the invention has been described by making a detailed reference to a presently preferred embodiment for a particular usage, numerous changes may be made in the several parts and their assembly, as well as in application and usage, without departure from the full intended scope of the invention as defined by the claims hereunto appended.

I claim:

1. In an axle bearing assembly for vehicles and the like, an inverted element of channel form constituting a bearing housing centrally recessed and formed to provide an open-bottom journal pocket, a journal for the axle or shaft, in said pocket, a substantially inverted U-shape cushion element of resilient material, overlying and laterally engaging the journal and located in said pocket, and a removable closure for the bottom opening of the journal pocket, detachably carried by the bearing housing.

2. In a bearing assembly for a vehicle axle or the like, a bearing housing in the form of an inverted channel constituting a body for the reception of a journal, a pair of web members spaced inwardly of the ends of the body and arranged in bridging relation to the sides of the channel and of a major trend depthwise of the channel, said web members coacting with the sides of the channel body to constitute a substantially rectangular journal-receiving pocket, a bolted bottom closure for the bearing housing, for retention of the journal therein, and an insert of compressible material formed so as substantially to surround the journal, and confined by said web members and closure.

3. In a bearing housing and shaft journal assembly including a bearing housing and a journal relatively loosely fitted therein, a pair of columns of resilient material disposed on opposite sides of the journal and arranged in the housing to receive loading stresses in lateral directions thereof and normal to the axis of a shaft in the journal, the journal being formed to provide a pair of laterally presented seats adapted to engage the ends of the columns in response to substantial loading on the housing.

4. In a bearing assembly for a vehicle axle or the like, a bearing housing, a journal in the housing, and resilient means arranged to cushion the upper portion of the journal and the sides thereof, said cushioning means including a pair of columns, means on the journal forming seats for engagement with the ends of the columns, and a bridge piece above the journal and in the housing, the bridge piece being of a depth such as normally to maintain the columns out of compressed engagement by said seats, but such that, upon compression of the bridge piece, said seats will coact with the columns and the columns coact with the bridge piece in providing a compressed cushion for the journal.

5. In a bearing assembly for a shaft such as a vehicle axle, a bearing housing having an open-bottom, substantially rectangular pocket for a journal, a detachable bottom closure for the pocket, the sides of the pocket being partly open, a journal in the pocket, a journal closure element, and a resilient embrasure for the journal in the pocket, the journal closure being slidably disposed in an open side of the housing pocket, and shaped and located to coact with the metal along the opening for restraining yielding displacement of the journal against its embrasure, in at least one direction of displacement of the journal in the housing under influence of shaft stresses.

6. In a bearing assembly for a shaft such as a vehicle axle, a bearing housing formed of sheet metal in channel form including a bridge piece provided with apertures for the reception of bolts securing the housing to a vehicle sill or the like, and a pair of spaced housing flanges, a pair of web elements bridging the flanges, extending depthwise of the housing, and serving, in a fore and aft direction to define a journal pocket, a journal in said pocket about the shaft or axle, a bottom closure plate for the journal pocket bridgingly bolted to the lower extremities of the housing flanges, an inverted U-shaped element formed of a rubber-like material and extending across the top and downwardly along the sides of the journal between the web portions of the housing and constituting a vertical, as well as a fore-and-aft cushion about the journal, said cushion having a plurality of recessed portions facilitating distortion under compression and aiding in flow of the rubber-like material constituting the cushion, under compression stresses, a pair of projections formed on the journal and constituting seats adapted to engage the ends of the U-shaped cushion member under certain conditions of loading of the housing, and a rebound cushion or pad of a resilient rubber-like material overlying the closure plate to serve as a recoil pad beneath the journal.

7. In the bearing housing and shaft journal assembly, a journal detachably and movably retained in the housing, a resilient cushioning structure comprised of a bridge and two columns, at least partly surrounding the journal and confined by the housing, the bridge being of a depth, or dimension in a direction along the line of loading, at least equal to the corresponding dimension of the space therefor within the housing, whereby the bridge is under compression under any condition of appreciable housing loading, and the columns being slightly shorter depthwise of the assembly, than the spaces therefor within the housing, whereby the columns are under compression only under relatively heavier loads on the housing.

8. In a bearing housing and shaft journal assembly, a journal detachably assembled and floatingly retained in the housing, the housing and journal being shaped to provide chambered portions therein, a resilient member fitted into one of said chambered portions so as to be relatively snugly confined between the journal and the housing in a direction depthwise of the housing, whereby said resilient member is under a moderate compression under any appreciable loading of the housing, a second resilient element disposed in another chambered portion between the journal and housing, and loosely fitted, depthwise of the last said chambered portion, whereby, under moderate conditions of housing loading, the last said resilient element is not appreciably compressed, the last said resilient element being shorter, in the direction of loading on the housing, than the chambered portion which it occupies, whereby a somewhat heavier loading of the housing serves further to load the first said resilient element and thereafter operates compressively to load the second said resilient element.

OTTO H. BRAUER.